April 8, 1930.  G. R. SULLIVAN  1,753,873
VEHICLE LOCK
Filed June 29, 1928
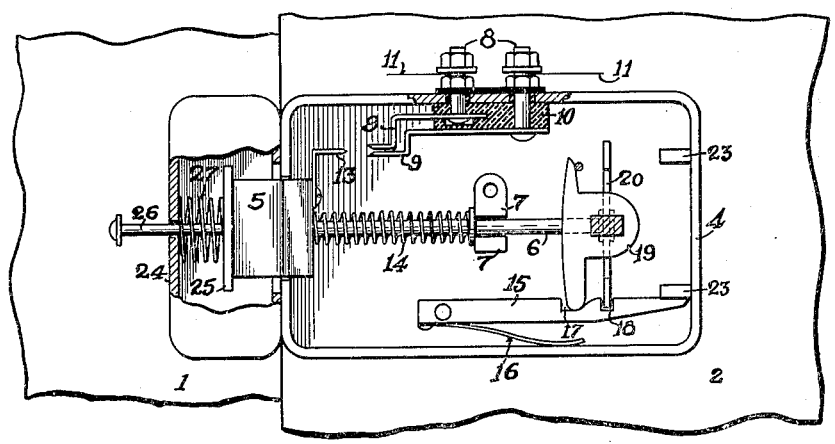
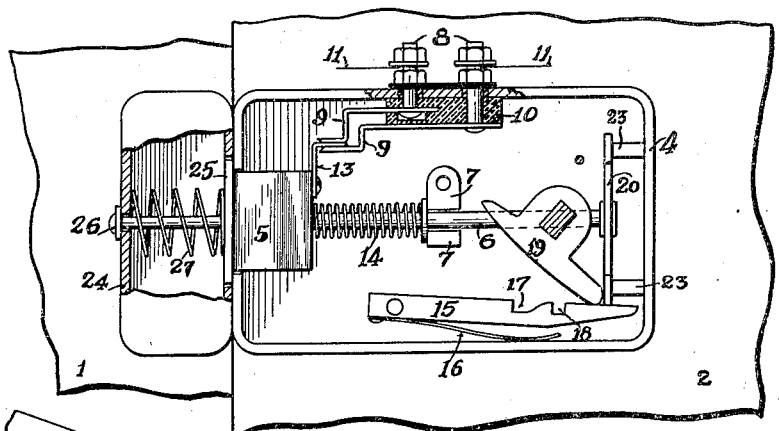
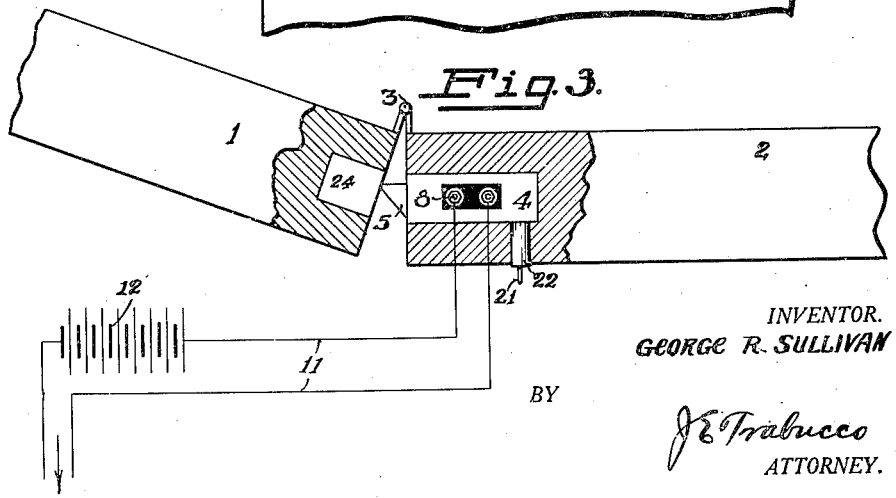
INVENTOR.
GEORGE R. SULLIVAN
BY
J. E. Trabucco
ATTORNEY.

Patented Apr. 8, 1930

1,753,873

UNITED STATES PATENT OFFICE

GEORGE R. SULLIVAN, OF OAKLAND, CALIFORNIA

VEHICLE LOCK

Application filed June 29, 1928. Serial No. 289,253.

This invention relates to improvements in automobile locks of the kind actuated by a door of a vehicle to place the ignition system of the vehicle in an inoperative condition.

An object of my invention is to provide a vehicle lock associated with a door and the ignition system of a vehicle which is actuated by the movement of the door to render the ignition system inoperative.

Another object of my invention is to provide a vehicle lock which is actuated by the closing of a door of a vehicle to open the electrical ignition circuit of the vehicle, whereby the vehicle is rendered inoperative until the circuit is closed by the unlocking of the lock with a key.

Other objects more or less apparent will present themselves or will be specifically pointed out in the description to follow:

In the accompanying drawings:

Fig. 1 is a side view of my improved vehicle lock showing the cover plate removed and the means for closing an electrical circuit disengaged from the contact points of the circuit;

Fig. 2 is a similar view, showing the means for closing the electrical circuit in an engaged position with the contact points of the circuit; and Fig. 3 is a diagrammatic view showing an electrical circuit, the door and the body of a vehicle, and the locking mechanism connected to the circuit.

Referring to the drawings the numeral 1 represents a door hinged to the body 2 of a vehicle by hinges 3. Attached to the body 2 as by screws or other suitable means is a lock casing 4 having a plunger 5 movably extending through an opening in its front side edge. The plunger is positioned adjacent the hinged edge of the door and is provided with a plunger rod 6 which is slidably supported in the casing 4 by a pair of projections 7 extending outwardly from a side of the casing. Secured to a side of the casing by metallic screws 8 are two contact strips 9 which are separated from each other and the casing by an insulating material 10. The screws 8 are connected to an electrical circuit 11 which is supplied with electrical energy from a battery or other suitable means 12. The screws extend through suitable insulating material which prevents the flow of electrical energy into the side of the casing. Secured to the plunger 5 and adapted to move backwardly and forwardly therewith is a metal member 13 which may engage with the contact strips 9 to close the circuit 11. A spiral spring 14 encircling the plunger rod 6 with its ends engaging with the projections 7 and the plunger 5, tends to force the plunger forwardly whereby the metal member 13 may be disengaged from contact with the strips 9.

Pivotally attached to a side of the casing is a locking member 15 which is as by a pin is a locking member 15 which is forced upwardly by a spring 16. The locking member is provided therein with two notches 17 and 18, into which may lodge respectively a lever member 19 and a locking bar 20. The locking bar is secured to the plunger rod 6 and is adapted to be moved forwardly therewith so as to engage with the notch 18 of the locking member 15 and prevent the plunger from moving backwardly. The lever member 19 is pivotally attached to the cover plate of the casing, (which for the sake of clearness and brevity has been omitted from the drawings) and the said lever member is adapted to be turned by a suitable key 21 placed inside a cylinder 22. A pair of projections 23 extending forwardly from the rear side of the casing serve to prevent the locking member from being forced upwardly too far by the spring 16, and also to prevent the locking bar 20 from being forced too far backwardly.

Attached to the edge of the door as by screws, is a casing 24 which has a rectangular shaped opening at its rear side within which fits a movable plate 25. The plate is secured to a pin 26 which movably extends through a hole in the front side of the casing 24, and a spiral spring 27 encircling the said pin with its ends pressing against the plate 25 and the front side of the casing 24 serves to normally maintain the said plate in a backwardly pressed position inside the edges of the rectangular shaped opening in the casing 24. The spiral spring 27 is adapted to exert sufficient force against the plate 25 to normally prevent the plunger 5 from moving forwardly when the door is closed and disengage the metal member 13 from the contact strips 9.

Assuming that the door is closed as shown in Fig. 2, the plunger 5 is maintained in such a position by the spring pressed plate 25 to cause the metal member 13 to engage with the contact strips 9, thereby completing or closing the circuit 11 which enables the flow of electrical energy for the proper operation of the vehicle. When the door is opened the pressure against the plunger 5 is removed and the spring 14 pressing against the latter carries the plunger rod 6 and the locking bar 20 forwardly, thereby enabling the latter to engage with the notch 18 in the locking member 15 as shown in Fig. 1. The plunger 5 upon moving forwardly carries the metal member 13 away from the contact strips 9 and opens the circuit 11, thereby discontinuing the flow of electricity through the latter. To again close the circuit it is necessary to insert a key 21 into the cylinder 22 and turn the lever member 19 so as to press the locking member 15 downwardly. As the locking member 19 is pressed downwardly so as to disengage the notch 18 from the locking bar 20, the lever member presses against the said locking bar and carries it backwardly. As the locking bar 20 is carried backwardly by the lever member 19 the plunger 5 and the metal member 13 are moved with it, thereby causing the metal member 13 to again engage with the contact points 9 and complete or close the circuit 11. The circuit is maintained in a closed condition by the door being closed and the spring pressed plate holding the plunger backwardly.

It is apparent to those skilled in the art that my improved locking mechanism may be embodied in other forms than the one shown and described, so for this and other apparent reasons I desire my invention included broadly within the spirit of the appended claims.

Having described my invention what I claim is:

1. In a vehicle lock, a casing, a plunger movably mounted in the casing, contact means mounted on the casing, a contact point carried by the plunger and adapted to contact with the contact means, means for maintaining the plunger in a position where the contact point does not engage with the contact means, and means for maintaining the plunger in a position where the contact point contacts with the contact means.

2. In a vehicle lock, a casing, a plunger mounted in the casing having a plunger rod affixed thereto, contact means mounted on the casing, a contact member carried by the plunger and adapted to engage with the contact means, means connected to the plunger rod for maintaining the plunger in a position where the contact member does not engage with the contact means, and resilient means for maintaining the plunger in a position wherein the contact member engages with the contact means.

3. In a vehicle lock, a casing, a plunger mounted in the casing, a contact means mounted on the casing, a contact member carried by the plunger and adapted to contact with the contact means, a spring for forcing the plunger in an outward direction whereby the contact member disengages from the contact means, means for maintaining the plunger in a position wherein the contact member does not engage with the contact means, and a spring pressed member for normally maintaining the plunger in a position wherein the contact member engages with the contact means.

4. In a vehicle lock, a casing, a plunger mounted in the casing, contact means mounted on the casing, a contact member carried by the plunger and adapted to engage with the contact means, a spring for moving the plunger in a direction whereby the contact member is disengaged from the contact means, means for locking the plunger against movement whereby the contact member is maintained in a disengaged position with reference to the contact means, and a spring pressed member engageable with the plunger for normally maintaining the plunger in a position wherein the contact member is engaged with the contact means.

GEORGE R. SULLIVAN.